(12) United States Patent
Lakos (10) Patent No.: US 12,208,852 B2
(45) Date of Patent: Jan. 28, 2025

(54) CONVERTIBLE DEVICE TO BE USED AS SPORTS EQUIPMENT FOR CHILDREN OR AS A PRAM

(71) Applicant: Dániel Lakos, Budapest (HU)

(72) Inventor: Dániel Lakos, Budapest (HU)

( * ) Notice: Subject to any disclaimer, the term of this patent is extended or adjusted under 35 U.S.C. 154(b) by 223 days.

(21) Appl. No.: 17/913,382

(22) PCT Filed: Apr. 7, 2021

(86) PCT No.: PCT/HU2021/000002
§ 371 (c)(1),
(2) Date: Sep. 21, 2022

(87) PCT Pub. No.: WO2021/205190
PCT Pub. Date: Oct. 14, 2021

(65) Prior Publication Data
US 2023/0373588 A1     Nov. 23, 2023

(30) Foreign Application Priority Data

Apr. 8, 2020   (HU) .................................. P2000127

(51) Int. Cl.
*B62K 13/00*     (2006.01)
*B62K 9/00*      (2006.01)
*B62K 13/06*     (2006.01)

(52) U.S. Cl.
CPC ............... *B62K 13/06* (2013.01); *B62K 9/00* (2013.01)

(58) Field of Classification Search
CPC ........ B62K 13/06; B62K 13/00; B62K 13/02; B62K 13/04; B62K 13/08; B62K 9/00; B62K 3/02; B62K 3/14
See application file for complete search history.

(56) References Cited

U.S. PATENT DOCUMENTS 9,789,893 B2 * 10/2017 Young ................... B62K 13/04
11,161,539 B2 * 11/2021 Day ...................... B62K 13/04
(Continued)

FOREIGN PATENT DOCUMENTS

CN       113602405 A   * 11/2021
WO       2018193312 A2   10/2018
WO       2019203505 A1   10/2019

OTHER PUBLICATIONS

International Search Report of Application No. PCT/HU2021/000002 mailed Jul. 6, 2021.
(Continued)

*Primary Examiner* — John D Walters
(74) *Attorney, Agent, or Firm* — LADAS & PARRY LLP (57) ABSTRACT

An adjustment device usable on equipment such as sports equipment for children or as a pram, pushchair, stroller or similar device to adjust the spacing between wheels of such equipment. The adjustment device includes at least one slider body comprising a curved guide track disposed on the body of the equipment mirror-symmetrically to the longitudinal principal plane of the at each side of said longitudinal principal plane, the slider body comprises a sliding member that is configured to correspond in size and shape to the curved guide track of the slider body, and can be displaced along the curved guide track of the slider body, with the curved movement paths of the sliding members and the centrelines of the guide tracks of the slider body constituting mutually corresponding circular arcs.

14 Claims, 2 Drawing Sheets

(56) References Cited

U.S. PATENT DOCUMENTS

| | | | |
|---|---|---|---|
| 11,572,093 B2* | 2/2023 | Yoo | B62K 15/00 |
| 2022/0126947 A1* | 4/2022 | Rood | B62K 3/005 |

OTHER PUBLICATIONS

Written Opinion of Application No. PCT/HU2021/000002 mailed Jul. 6, 2021.

* cited by examiner

CONVERTIBLE DEVICE TO BE USED AS SPORTS EQUIPMENT FOR CHILDREN OR AS A PRAM

RELATED APPLICATION

This application is an application under 35 U.S.C. 371 of International Application No. PCT/HU2021/000002 filed on 7 Apr. 2021, which claims priority from Hungarian Application No. P2000127 filed 8 Apr. 2020 the disclosures of which are incorporated in their entirety by reference herein.

TECHNICAL FIELD

Convertible device to be used as sports equipment for children or as a pram, pushchair, stroller or similar comprising a carrier body, at least two main wheels connected to the carrier body via axles, and a support member that can be disposed on the carrier body, wherein the rotation shaft of one of the main wheels is connected to a steerer column rotatably connected to the carrier body, with the axle of the other main wheel being connected to the carrier body, and wherein the device comprises at least two adjustable-distance side wheels that are spaced apart by a variable spacing at both sides of the longitudinal principal plane of the carrier body, each side wheel being rotatably connected to a respective wheel holder member via a respective side axle, and with the wheel holder members being movably connected to the carrier body.

BACKGROUND ART

To address the problem of transporting children of various ages, a large number of prams and prams with frame structures of different sizes and shapes have been developed to date. However, prams and prams that are suited for performing other functions are becoming more and more widespread nowadays. With minor conversions, these can be used as balance bicycles, children's tricycles, or children's bicycles. That is, they are suited not only for transporting young children who cannot yet walk, but also for strengthening children's legs.

Such a solution is disclosed, among others, in the document with publication number US 2015/021877. The essential features of this solution are that certain elements of the frame structure situated in the portion near the rear wheel are interconnected such that they can be rotated about a shaft, and that the rear axle is replaceable. Thereby, the same frame structure can be applied for producing a two-wheel or a three-wheel children's bicycle, or a pram.

However, this technical solution has the disadvantage that the conversion from one embodiment to another can only be carried out utilizing tools and requires certain specific skills. A further disadvantage of the solution is that the conversion process is time-consuming, and the replaced components need to be stored. Therefore, the conversion is difficult to perform under street conditions.

Solutions that can be converted from pram to two types of tricycle are disclosed in utility model CN 204077941 and in the document with publication number US 2014/0103616.

In case of the former, the wheels and the seat can be displaced relatively simply, so a tricycle can be relatively easily converted into a pram suitable for carrying children. However, it has the disadvantage that the two wheels disposed on the same axle are situated on the steerable axle, which not only makes steering difficult but is also dangerous, while the pram cannot even be converted into a balance bicycle.

The disadvantage of the latter solution is that it has complex structure, its conversion requires specific skills and takes a longer time, while due to their relatively large size the additional components are especially cumbersome to transport. So, this technical solution does not allow for the easy "in the field" conversion of the pram into for example a balance bicycle, e.g., by a parent of a child who already can walk but still needs to be seated in a pram from time to time.

The objective of the configuration according to the invention is to eliminate the drawbacks of known multi-role, convertible prams, and to provide such a convertible device that, in addition to its simple configuration, allows that the conventional three-wheel pram can be converted into a balance bicycle or tricycle manually (by a few simple movements), without using any tools and any substantial effort, and without there being a need to add or remove any components, such that safe steering and maneuverability are retained in the pram and balance bicycle or tricycle states.

The configuration according to the invention was motivated by the recognition that in case certain components of the frame structure are implemented applying curved (bent) members that are connected to each other and to other components of the frame structure at appropriate positions with appropriate orientation, and in case such further slidable components are affixed to these bent members that are adapted to be pulled out from and reintroduced into said bent members of the frame structure along curved movement paths in a preferably symmetrical manner, while disposing wheels also on these slidable members, then, by displacing these slidable members inward and outward, the distance between the wheels disposed on the slidable members can be changed simply, implying that the conversion from pram to balance bicycle and vice versa can also be easily realized, so the objective of the invention can be fulfilled.

DISCLOSURE OF THE INVENTION

In accordance with the objective of the invention, there is provided a convertible device to be used as sports equipment for children or as a pram, comprising a carrier body, at least two main wheels connected to the carrier body via axles, and a support member that can be disposed on the carrier body, wherein the rotation shaft of one of the main wheels is connected to a steerer column rotatably connected to the carrier body, with the axle of the other main wheel being connected to the carrier body, and wherein the device comprises at least two adjustable-distance side wheels that are spaced apart by a variable spacing at both sides of the longitudinal principal plane of the carrier body, each side wheel being rotatably connected to a respective wheel holder member via a respective side axle, and with the wheel holder members being movably connected to the carrier body, the device being configured such that at least one respective slider body comprising a respective curved guide track is disposed on the carrier body, mirror-symmetrically to the longitudinal principal plane of the carrier body, at each side of said longitudinal principal plane, the slider body comprises a sliding member that is configured to correspond in size and shape to the curved guide track of said slider body, and can be displaced along the curved guide track of the slider body, the carrier plane containing the centreline of the curved guide track of one of the slider bodies and the carrier plane containing the centreline of the curved guide track of the other slider body are disposed mirror symmetrically with respect to the longitudinal principal plane of the carrier body, with the curved movement paths of the sliding members and the centrelines of the guide tracks of the slider body constituting mutually corresponding circular arcs.

Another feature of the convertible device according to the invention can be that one of the sliding members is associated with one of the wheel holder members, with the other sliding member being associated with the other wheel holder member, while each wheel holder member is slidably coupled to the corresponding slider body by means of the sliding members.

In another variant of the convertible device one of the wheel holder members and one of the sliding members are each formed as a single-piece component, with the other wheel holder member and the other sliding member being also formed as single-piece components.

In yet another realization of the invention the wheel holder members have respective centrelines, the centreline of each wheel holder members being shaped identically to the shape of the centreline of the guide tracks of the slider body cooperating with the given wheel holder member.

In still another embodiment of the convertible device the straight line connecting the connection points of the side wheels of each of the wheel holder members and the side axles adapted to cooperate therewith is perpendicular to the longitudinal principal plane of the carrier body.

In a further configuration of the invention the connection points of the side wheel of each of the wheel holder members and the side axle adapted to cooperate therewith are disposed, at least in the outer end position of the wheel holder members, symmetrically to the longitudinal principal plane of the carrier body.

In a favourable configuration of the convertible device the slider bodies and the wheel holder members are formed of tube sections, with the sliding members and the wheel holder members being retractably inserted, at least partially, into the tube cavity of the tubular slider bodies.

A yet another variant of the invention further comprises a synchronizing unit, wherein the synchronizing unit comprises rotation transmission shaft and transmission members secured to the rotation transmission shaft, each transmission member being in movement transmission connection with the wheel holder members.

Still another configuration of the convertible device further comprises support members adapted for connecting a carrier seat, wherein each support member comprises a coupling projection capable of securing the carrier seat, and wherein a further slider bodies, each comprising a respective curved guide track, are disposed on the carrier body, mirror-symmetrically to the longitudinal principal plane of the carrier body, at each side of said longitudinal principal plane, each slider body is associated with a sliding member that is configured to correspond in size and shape to the curved guide track of said slider body, and can be displaced along the curved guide track of the slider body, the carrier plane containing the centreline of the curved guide track of one of the slider bodies and the carrier plane containing the centreline of the curved guide track of the other slider body are disposed mirror symmetrically with respect to the longitudinal principal plane of the carrier body, and the carrier plane containing the centreline of the curved guide track of one of the slider bodies and the carrier plane containing the centreline of the curved guide track of the other slider body lie at an acute angle of tilt relative to each other, with the curved movement paths of the sliding members and the centrelines of the guide tracks of the slider body constituting mutually corresponding circular arcs, and the end of one of the support members situated opposite the other end thereof carrying a coupling projection being associated with one of the sliding members, and the end of the other support member situated opposite the end thereof carrying a coupling projection being associated with the other sliding member, while each support member is slidably coupled to the corresponding slider body by means of the sliding members.

In a further variant of the invention one of the support members and one of the sliding members are each formed as a single-piece component, with the other support member and the other sliding member being also formed as single-piece components.

A potentially favourable realization of the invention further comprises a synchronizing unit, wherein the synchronizing unit comprises a rotation transmission shaft and transmission members secured to the rotation transmission shaft, each transmission member being in movement transmission connection with a respective support member. Optionally, the rotation transmission shaft of the synchronizing unit comprises further transmission members, wherein a part of the transmission members is in movement transmission connection with the wheel holder members and another part of the transmission members is in movement transmission connection with the support members.

In a potentially favourable realization of the invention the slider bodies and the support members are formed of tube sections, with the sliding members and the support members being retractably inserted, at least partially, into the tube cavity of the tubular slider bodies.

In a further realization of the convertible device the carrier plane containing the centreline of the curved guide track of one of the slider bodies and the carrier plane containing the centreline of the curved guide track of the other slider body lie at a mutual angle of inclination smaller than 180°.

The convertible device according to the invention has a number of preferable features. The most important of these is that—thanks to the curved slider bodies disposed symmetrically to the longitudinal principal plane of the carrier body, to the wheel holder members adapted to be displaced along a curved track between their two end positions, and to the support members—the convertible device can be converted from its two-wheel balance bicycle state to its tricycle pram state and vice versa quickly and easily, i.e., without utilizing any tools or installing any further components.

A further advantageous feature is that the convertible device consist of a low number of components, so it has a low failure probability and has minimal maintenance demand.

It should also be mentioned among the advantages that, thanks to the low number of components, the convertible device has relatively low mass, and thus it can be handled and moved around with less effort compared to other devices.

It can also be considered an advantage that, in the case of slider bodies made of tube, the wheel holder members that are fitted into the slider bodies and are adapted to be inserted therein in the balance bicycle state make the carrier body even more rigid and resistant, which may result in a sports device that provides improved safety when used by children.

BRIEF DESCRIPTION OF THE DRAWINGS

The convertible device according to the invention will be described in more detail below in relation to exemplary embodiments, referring to the accompanying drawings, where.

MODES FOR CARRYING OUT THE INVENTION

Figure 1:
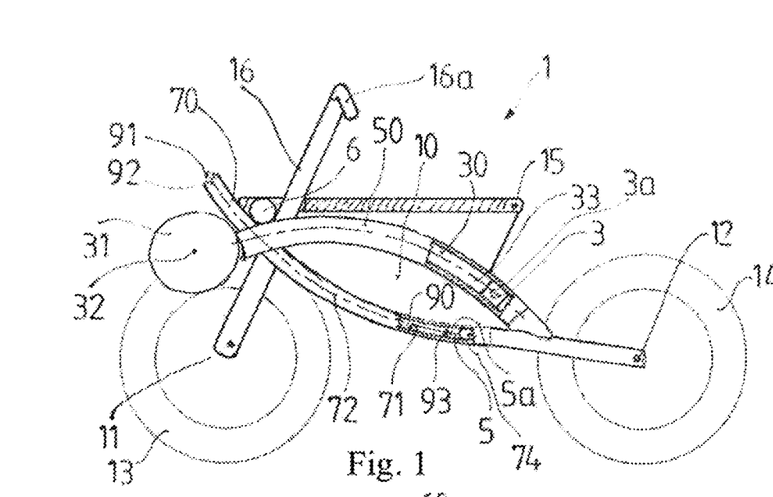
FIG. 1 is a partial sectional side-elevation view of a possible variant of the convertible device showing the device in the balance bicycle state.
Figure 2:
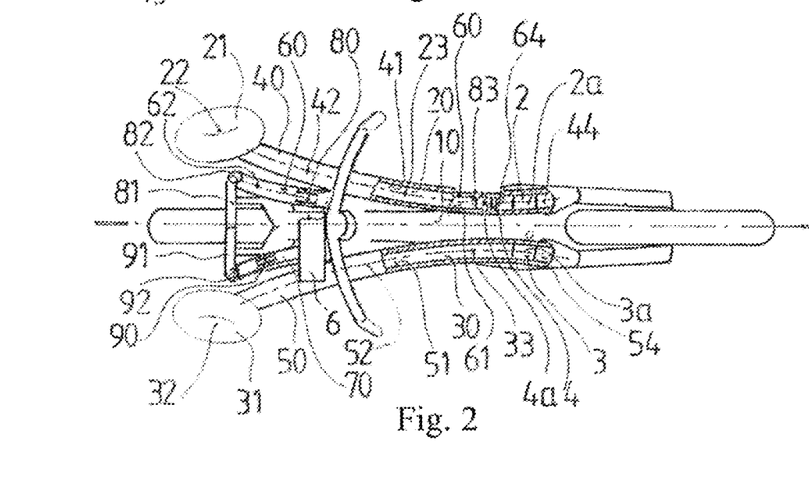
FIG. 2 is the top plan view of the convertible device according to FIG. 1.

FIGS. 1 and 2 show a possible implementation of the convertible device 1 according to the invention in the balance bicycle state. As can be observed, the carrier body 10 of the convertible device 1 comprises a steerer column 16 adapted for retaining the axle 11 holding the front main wheel 13 of the convertible device 1, with a handlebar 16a being disposed at the end of the steerer column 16 situated opposite the axle 11. An axle 12 adapted for holding the rear main wheel 14, and a seat 15 that forms a part of the casing of the carrier body 10 are also connected to the carrier body 10.

As it is shown in FIG. 2—where the seat 15 has been removed from the carrier body 10—for better visibility, a slider body 40 adapted to carry a wheel holder member 20 comprising a side wheel 21, a slider body 50 adapted to partially receive a wheel holder member 30 comprising a side wheel 31, a slider body 60 holding a support member 80, and a slider body 70 adapted to partially receive a support member 90 are also affixed to the carrier body 10. The side wheel 21 is coupled to the wheel holder member 20 by a side axle 22, while the side wheel 31 is connected to the wheel holder member 30 via a side axle 32. It has to be noted at this point that the side wheel 21 and the wheel holder member 20 as well as the side axle 22 and the side axle 32 situated between the side wheel 31 and the wheel holder member 30 can also be configured to enable, in addition to the side wheel 21 being able to be rotated about the side axle 22, that the side axle 22 can also be rotated about the wheel holder member 20. It is self-evident that the same holds true for the relationship between the wheel holder member 30, the side wheel 31, and the side axle 32. In such a manner, therefore, the side wheel 21 and the side wheel 31 are self-adjusting, which greatly improves the control of the convertible device 1 in the pram mode, and also improves the maneuvering capability thereof.

Of course, such a variant can also be conceived wherein the side wheel 21 and the side wheel 31 can be rotated about the side axle 22 of the wheel holder member 20 and the side axle 32 of the wheel holder member 30, respectively, but the side axle 22 and the side axle 32 cannot be rotated about the wheel holder member 20 and the wheel holder member 30.

The slider bodies 40, 60 are disposed on one side of the longitudinal principal plane 17 of the carrier body 10, while the slider bodies 50, 70 are displaced on the other side of the longitudinal principal plane 17 of the carrier body 10, and are positioned such that the slider bodies 50 and 40, as well as the slider bodies 60 and 70, are situated mutually symmetrically with respect to the longitudinal principal plane 17.

As it is well illustrated in FIG. 1, in this implementation the slider body 50 fixedly attached to the carrier body 10 is made of rectangular-profile tube, and has a curved configuration, while the centreline 52 also forms a circular arc. Also, as a result of this, the curved guide track 51 bounding the tube cavity 54 also has a bent shape. A portion of the wheel holder member 30 is situated in the tube cavity 54 of the slider body 50, while the sliding member 3 is connected to the end of the wheel holder member 30 situated opposite the end carrying the side axle 32 holding the side wheel 31. The function of the sliding member 3 is to enable the easy displacement of the wheel holder member 30 inside the tube cavity 54 of the slider body 50.

In the case of the given embodiment, the sliding member 3 is a separate component that is coupled to the wheel holder member 30. However, it has to be noted here that the sliding member 3 can also be formed from the wheel holder member 30. In such a case, the wheel holder member 30 and the sliding member 3 are made integrally (as a single-piece component).

In order that the wheel holder member 30 can be simply pulled out from and reintroduced into the tube cavity 54 of the slider body 50, the centreline 33 of the wheel holder member 30 is aligned with and overlaps the centreline 52 of the slider body 50. Also, the movement path 3a of the sliding member 3 corresponds to the curved guide track 51 of the slider body 50, and is aligned with the centreline 52 of the slider body 50.

It is important to note that it is not imperative that the slider body 50 be made from rectangular-profile tube. The slider body 50 can also be configured differently, for example applying a C-profile having a longitudinal notch, or optionally a circular-profile tube.

It can also be well observed in FIG. 1 that in this case the slider body 70 is also implemented as a structural member made of rectangular-profile tube. The centreline 72 of the slider body 70 also forms a circular arc. Consequently, the curved guide track 71 of the slider body 70—encompassing the tube cavity 74—also has a bent shape. A portion of the support member 90 is situated inside this tube cavity 74 of the slider body 70, with the sliding member 5 affixed to the end 93 of the support member 90 lying opposite the end 92 thereof holding the coupling projection 91 also being situated therein. The purpose of the coupling projection 91 is to connect the support member 80 and the support member 90 in their position determined by the coupling projection 81, and—as it will be described in detail referring to FIGS. 4-6 below—to facilitate the control of the convertible device 1 in the pram state.

In this embodiment, the sliding member 5 is a separate component that is affixed to the other end 93 of the support member 90, with the purpose of enabling that the support member 90 can be easily slid into and out of the tube cavity 74 of the slider body 70. However, it also has to be noted here that the sliding member 5 and the support member 90 may be formed as a single, integral component. In such a case, the end 93 of the support member 90 has to be configured such that it provides that the support member 90 can be displaced easily.

It also holds true in the case of the slider body 70 and the support member 90 adapted to be displaced therein that the centreline 72 of the slider body 70 and the movement path 5a of the sliding member 5 of the support member 90 are mutually aligned and overlap each other, both forming an identical circular arc.

It is important to mention again that it is not imperative that the slider body 70 be made from rectangular-profile tube. The slider body 70 can also be configured differently, for example applying a C-profile tube with a longitudinal notch, or optionally a circular-profile tube.

In FIG. 2 it is also shown that the configuration and relative position of the slider body 40 and the wheel holder member 20 is essentially identical to the configuration and relative position of the slider body 50 and the wheel holder member 30. The slider body 40 is also formed of curved tube, with the centreline 42 thereof constituting a circular arc identical to the centreline 52 of the slider body 50, with the guide track 41 also having a curved configuration. A portion of the wheel holder member 20 and the sliding member 2 attached to the wheel holder member 20—which is implemented as a separate component also in this case—are situated in the tube cavity 44 of the slider body 40 However, the latter can of course also be formed of the material of the wheel holder member 20. The centreline 23 of the wheel holder member 20 coincides with the centreline 42 of the slider body 40, with the movement path 2a of the sliding member 2 also being situated along the same circular arc.

The same can be maintained in relation to the slider body 60 and the support member 80. The configuration and the manner of interconnection of these components is identical to the configuration and interconnection of the slider body 70 and the support member 90. The curve radius of the centreline 62 of the slider body 60 is identical to the curve radius of the centreline 72 of the slider body 70, with the guide track 61 of the slider body 60 that bounds the tube cavity 64 also having a curved shape. A significant portion of the support member 80 is situated in the tube cavity 64, with essentially only the coupling projection 81 situated at one end 82 of the support member 80 protruding from the tube cavity 64. The sliding member 4, which in this case is a separate structural component, is disposed at the other end 83 of the support member 80, and is adapted to provide that the support member 80 can be easily slid into and out of the tube cavity 64 of the slider body 60. However, it also holds true in the case of the sliding member 4 that it can be a portion formed of the other end 83 of the support member 80, configured integrally with the support member 80. It is self-evident that the movement path 4a of the sliding member 4 is identical to the centreline 62 of the slider body 60, and is supported thereon.

For easier comprehension, in FIG. 2 the portion of the slider body 40 situated near the main wheel 14 is shown broken out such that the position of the other end 83 of the support member 80 disposed in the slider body 60 and the sliding member 4 connected thereto can be observed.

As can also be seen in FIG. 2, in this embodiment the synchronizing unit 6 is also disposed on the carrier body 10. The function of the synchronizing unit 6 is to provide a positive couple between the wheel holder member 20, the wheel holder member 30, the support member 80, and the support member 90. This is because in such a case the slidable structural components are configured to protrude simultaneously from the slider bodies 40, 50, 60, and 70 that are adapted to carry them.

Figure 3:
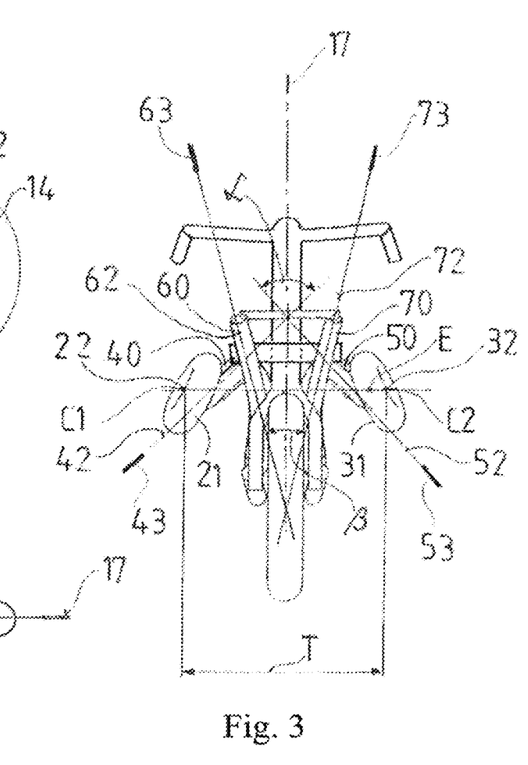
FIG. 3 is the front view of the convertible device according to FIG. 1.

Turning now to FIG. 3, in the figure there can be observed that the carrier plane 43 and the carrier plane 53 that contain the centreline 42 of the slider body 40 and the centreline 52 of the slider body 50, respectively, extend symmetrically with respect to the longitudinal principal plane 17 of the carrier body 10. In this case, the carrier plane 43 lies at an acute angle of inclination α relative to the carrier plane 53. In the plane of FIG. 3, the longitudinal principal plane 17 also bisects the angle of inclination α.

Further, the carrier plane 63 containing the centreline 62 of the slider body 60, and also the carrier plane 73 containing the centreline 72 of the slider body 70 extend symmetrically to the longitudinal principal plane 17 of the carrier body 10, with the carrier planes 63 and 73 lying at an angle of tilt β with respect to each other. In the plane of FIG. 3, the longitudinal principal plane 17 also bisects the angle of tilt β.

It can also be seen that the straight line E interconnecting the connection point C1 of the side wheel 21 and the side axle 22 and the connection point C2 of the side wheel 31 and the side axle 32 extends at a right angle relative to the longitudinal principal plane 17 of the carrier body 10. Furthermore, the spacing T between the side wheel 21 and the side wheel 31 is small, because the wheel holder member 20 is fully introduced into the tube cavity 44 of the slider body 40, with the wheel holder member 30 being fully introduced into the tube cavity 54 of the slider body 50. As a result of this, however, the side wheel 21 and the side wheel 31 are not able to touch the ground on which the main wheels 13, 14 of the carrier body 10 rest.

In this "collapsed" position of the convertible device 1 the convertible device 1 can be used by a child—seated on the support member 15 thereof—as a balance bicycle, controlling it by turning the steerer column 16 via the handlebar 16a, thereby turning the main wheel 13 that is connected to, and is adapted to rotate about, the axle 11.

It should also be noted at this point that the slider bodies 40, 50, 60, and 70, the wheel holder members 20, 30, and the support members 80, 90 are expediently made of plastic, but it is also conceivable to make these components of metal.

Figure 4:
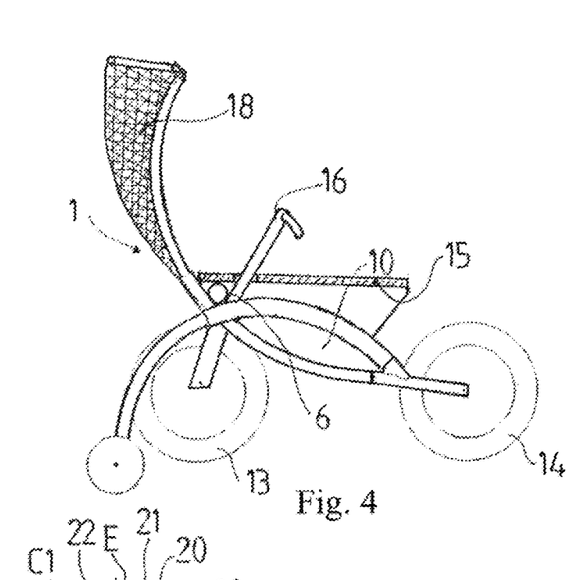
FIG. 4 is a partial sectional side-elevation view of a possible variant of the convertible device showing the device in the pram state.
Figure 5:
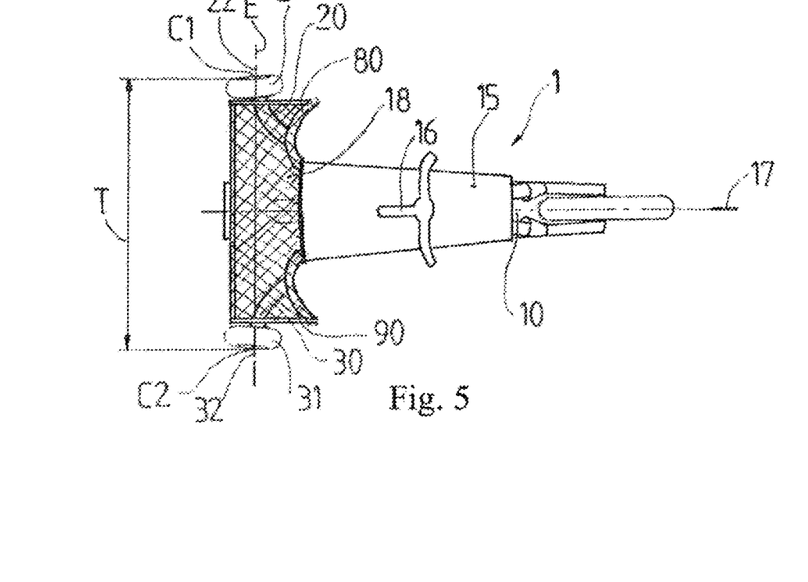
FIG. 5 is the top plan view of the convertible device according to FIG. 4.
Figure 6:
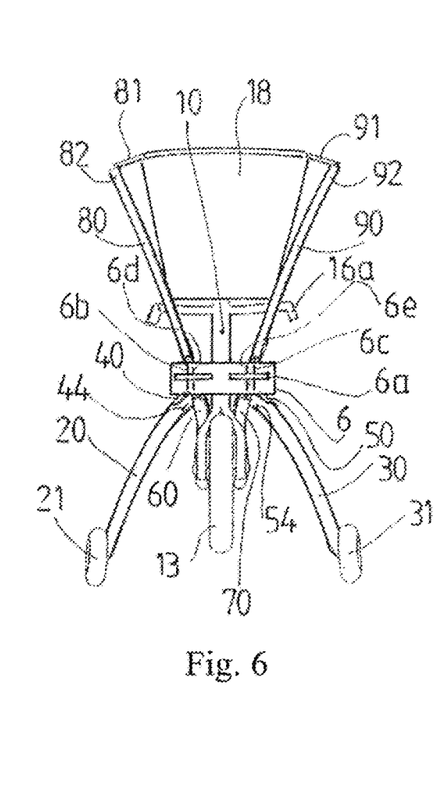
FIG. 6 is the front view of the convertible device according to FIG. 4.

Turning now to FIGS. 4-6, these figures show such a configuration of the carrier body 10 shown in FIGS. 1-3 wherein the wheel holder members 20, 30 and the support members 80, 90 are in an outward extended position, i.e., in the "pram state".

As it can be well observed in FIGS. 4 and 6, in the outward extended end position of the wheel holder member 20 introduced into the column cavity 44 of the slider body 40 and the wheel holder member 30 situated in the tube cavity 54 of the slider body 50—thanks to the bent shape of the slider body 40 and the wheel holder member 20, and of the slider body 50 and the wheel holder member 30—the side wheels 31, 21 are supported on the ground, while the main wheel 13 bracketed by the side wheel 31 and the side wheel 21 does not touch the ground, with the main wheel 14 still resting on the ground.

As it is also illustrated in FIG. 6, the first ends 82 and 92 of the support members 80 and 90 extended outward from the slider body 60 and the slider body 70, respectively, are brought at such a height and relative distance that the coupling projection 81 that is situated at the end 82 of the support member 80 and is coupled to the coupling projection 91 situated at one the 92 of the support member 90 is at an ergonomic position that corresponds to the position of the pusher handle of a pram. In this state, the lightweight carrier support 18 adapted for functioning as a backrest for the child is introduced into the spatial region between the elevated support members 80, 90 and the carrier body 10.

Also, as shown in FIG. 5, the spacing T between the side wheel 21 of the extended (pulled-out) wheel holder member 20 and the side wheel 31 of the extended wheel holder member 30 is greater than in the state of the convertible device 1 shown in FIG. 3 (the balance bicycle state). However, the straight line E interconnecting the connection point C1 of the side wheel 21 and the side axle 22 and the connection point C2 of the side wheel 31 and the side axle 32 extends at a right angle relative to the longitudinal principal plane 17 of the carrier body 10 also in this state of the convertible device 1, with the components situated at both sides of the longitudinal principal plane 17 of the convertible device 1 being positioned symmetrically relative to each other.

For easier comprehension, in FIG. 6 the support member 80, the slider body 60, the support member 90, and the slider body 70 are shown partially broken out such that the synchronizing unit 6 can be seen more easily. The location of the synchronizing unit 6 on the carrier body 10 of the convertible device 1 is well shown in FIG. 6. To enable that the wheel holder member 20, the wheel holder member 30, the support member 80, and the support member 90 can be moved easily and in a simultaneous manner, the synchronizing unit 6 comprises a rotation transmission shaft 6a, a transmission member 6b attached to the rotation transmission shaft 6a, a transmission member 6c, a transmission member 6d, and a transmission member 6e The rotation transmission shaft 6a is rotatably connected to the carrier body 10, while the transmission members 6b, 6c, 6d, and 6e are in torque transmission connection with the wheel holder member 20, the wheel holder member 30, the support member 80, and the support member 90, respectively. In the case of the illustrated embodiment, the transmission members 6b, 6c, 6d, and 6e are implemented as pinions in connection with corresponding racks disposed on the wheel holder member 20, the wheel holder member 30, the support member 80, and the support member 90, respectively.

During the use of the convertible device 1 according to the invention, in the "collapsed" state a child can be seated on the support member 15 mounted on the carrier body 10 of the convertible device 1 like with a conventional balance bicycle, and can rotate the steerer column 16 with the help of the handlebar 16a to control the main wheel 13 of the convertible device 1.

In the course of the conversion process when the user pulls the coupling projection 81 of the support member 80 and/or the coupling projection 91 of the support member 90, then—in the present invention, thanks to the synchronizing unit 6 coupled to the carrier body 10—the support member 80 starts to slide outward from the tube cavity 64 of the slider body 60. The outward sliding movement of the support member 80 is facilitated by the—expediently low-friction—sliding member 4 adapted to move fully along the guide track 61 bounding the tube cavity 64 of the slider body 60.

As the support member 80 progresses outward from the slider body 60, it brings into rotation the transmission member 6d (being in torque transmission connection with the support member 80) about the rotation transmission shaft 6a of the synchronizing unit 6. In turn, the rotation transmission shaft 6a is brought into rotation by the transmission member 6d. Also, the rotating rotation transmission shaft 6a brings into rotation the transmission member 6e, thereby also exerting a force on the support member 90, which support member 90—due to the positive couple with the transmission member 6e—also starts to slide outward from the tube cavity 64 of the slider body 70 that has hitherto received it.

At the same time, the transmission members 6b, 6c rigidly attached to the rotation transmission shaft 6a of the synchronizing unit 6 are also brought into rotation. The transmission members 6b and 6c exert a force on the wheel holder member 20 and the wheel holder member 30, respectively. This also results in the wheel holder member 20 starting to move outward from the tube cavity 44 of the slider body 40, and the wheel holder member 30 starting to move outward from the tube cavity 54 of the slider body 50. Thus, the wheel holder members 20, 30 and the support members 80, 90 move (slide) outward from their respective base positions together, in a coordinated manner.

Because the wheel holder member 20 and the slider body 40, as well as the wheel holder member 30 and the slider body 50 have curved shape, and the carrier plane 43 containing the centreline 42 of the guide track 41 lies at an angle of inclination α greater than zero (expediently at an acute angle) with respect to the carrier plane 53 containing the centreline 52 of the guide track 51, the guide tracks 41, 51 diverge from each other and are directed downwards. Consequently, the end of the wheel holder member 20 that holds the side wheel 21 and the end of the wheel holder member 30 that holds the side wheel 31 start to move away from each other, while in the vertical direction they also get gradually further away from the handlebar 16a.

By the time the sliding member 4 of the support member 80 reaches its outer end position, the side wheels 21, 31 have not only contacted the ground but have already lifted the carrier body 10 of the convertible device 1 such that the main wheel 13 is not in contact with the ground. The synchronizing unit 6 can be locked in this position, so the wheel holder member or the wheel holder member 30 cannot slide backwards (in the direction of their starting position) into the tube cavity 44 of the slider body 40 or into the tube cavity 54 of the slider body 50. In this position, therefore, only the main wheel 14 (functioning as the front wheel of the pram) and the side wheels 21, 31 (functioning as rear wheels) are in contact with the ground. Thus, the convertible device 1, now brought in the pram state, becomes easily maneuverable.

Thanks to the fact that there is an angle of tilt β between the carrier planes 63, 73 of the slider bodies 60, 70—which planes contain the centrelines 62, 72 of the curved guide tracks 61, 71—during the lifting process, the end 82 of the support member 80 proximate the coupling projection 81 and the end 92 of the support member 90 proximate the coupling projection 91 are gradually distanced from each other. Thereby, the distance between the coupling projection 81 and the coupling projection 91 increases by such an extent that the projections can be comfortably utilized for pushing the pram. Furthermore, the carrier support 18 in which the child can be seated can also be affixed to the coupling projection 81, the coupling projection 91, and the carrier body 10.

When the device needs to be used again as a balance bicycle, the pram can be converted back into a balance bicycle by carrying out the steps of the conversion process in reverse order. After the synchronizing unit 6 has been freed up, upon depressing the coupling projection 81 of the support member 80 and/or the coupling projection 91 of the support member 90 in the direction of the carrier body 10, the rotation transmission shaft 6a of the synchronizing unit 6 starts to rotate, and, with the help of the transmission members 6b, 6c, 6d, and 6e, it pushes—essentially by itself—the support member 80 into the tube cavity 64 of the slider body 60, the support member 90 into the tube cavity 74 of the slider body 70, the wheel holder member 20 into the tube cavity 44 of the slider body 40, and the wheel holder member 30 into the tube cavity 54 of the slider body 50. While the support members 80, 90 are slid back, the carrier support 18—together with the coupling projection 81 and the coupling projection 91—is closed, and is retracted towards the carrier body 10 of the convertible device 1.

As the wheel holder members 20, 30 move backwards in the direction of the carrier body 10 in a coordinated manner, due to the side wheels 21, 31 being lifted from the ground, first the end of the carrier body 10 proximate the main wheel 13 is descended and then the main wheel 13 touches the ground, after which the convertible device 1 is again supported by the main wheels 13, 14. The support members 80 and 90 are retracted into the slider body 60 and 70, respectively, while the handlebar 16*a* situated at the end of the steerer column 16 lying opposite the main wheel 13 is freed up, i.e. it can be rotated again.

The convertible device according to the invention is well suited for use in such cases wherein the functions of a pram and a balance bicycle are needed to be performed by a single, quickly and simply convertible device.

The invention claimed is:

1. Convertible device to be used as sports equipment for children or as a pram, comprising a carrier body (10), at least two main wheels (13, 14) connected to the carrier body (10) via axles (11, 12), and a support member (15) that can be disposed on the carrier body (10), wherein the rotation shaft (11) of one of the main wheels (13) is connected to a steerer column (16) rotatably connected to the carrier body (10), with the axle (12) of the other main wheel (14) being connected to the carrier body (10), characterised in that the device comprises at least two adjustable-distance side wheels (21, 31) that are spaced apart by a variable spacing (T) at both sides of the longitudinal principal plane (17) of the carrier body (10), each side wheel (21, 31) being rotatably connected to a respective wheel holder member (20, 30) via a respective side axle (22, 32), and with the wheel holder members (20, 30) being movably connected to the carrier body (10), at least one respectively slider body (40, 50) comprising a respective curved guide track (41, 51) is disposed on the carrier body (10), mirror-symmetrically to the longitudinal principal plane (17) of the carrier body (10), at each side of said longitudinal principal plane (17), the one slider body (40) adapted to carry the one wheel holder member (20) comprising the one side wheel (21), the other slider body (50) adapted to partially receive the other wheel holder member (30) comprising the other side wheel (31), the slider body (40, 50) comprises a sliding member (2, 3) that is configured to correspond in size and shape to the curved guide track (41, 51) of the slider body (40, 50), and can be displaced along the curved guide track (41, 51) of the slider body (40, 50), the carrier plane (43) containing the centreline (42) of the curved guide track (41) of one of the slider bodies (40) and the carrier plane (53) containing the centreline (52) of the curved guide track (51) of the other slider body (50) are disposed mirror symmetrically with respect to the longitudinal principal plane (17) of the carrier body (10), with the curved movement paths (2*a*, 3*a*) of the sliding members (2, 3) and the centrelines (42, 52) of the guide tracks (41, 51) of the slider body (40, 50) constituting mutually corresponding circular arcs.

2. The convertible device according to claim 1, characterised in that one of the sliding members (2) is associated with one of the wheel holder members (20), with the other sliding member (3) being associated with the other wheel holder member (30), while each wheel holder member (20, 30) is slidably coupled to the corresponding slider body (40, 50) by means of the sliding members (2, 3).

3. The convertible device according to claim 1, characterised in that one of the wheel holder members (20) and one of the sliding members (2) are each formed as a single-piece component, with the other wheel holder member (20) and the other sliding member (2) being also formed as single-piece components.

4. The convertible device according to claim 1, characterised in that the wheel holder members (20, 30) have respective centrelines (23, 33), the shape of centrelines (23, 33) of each of the wheel holder members (20, 30) being identical to the shape of the centreline (42, 52) of the guide track (41, 51) of the slider body (40, 50) that is adapted to cooperate with the given wheel holder member (20, 30).

5. The convertible device according to claim 1, characterised in that the straight line (E) connecting the connection points (C1, C2) of the side wheels (21, 31) of each of the wheel holder members (20, 30) and the side axles (22, 32) adapted to cooperate therewith is perpendicular to the longitudinal principal plane (17) of the carrier body (10).

6. The convertible device according to claim 1 characterised in that the connection points (C1, C2) of the side wheel (21, 31) of each of the wheel holder members (20, 30) and the side axle (22, 32) adapted to cooperate therewith are disposed, at least in the outer end position of the wheel holder members (20, 30), symmetrically to the longitudinal principal plane (17) of the carrier body (10).

7. The convertible device according to claim 1, characterised in that the slider bodies (40, 50) and the wheel holder members (20, 30) are formed of tube sections, with the sliding members (2, 3) and the wheel holder members (20, 30) being retractably inserted, at least partially, into the tube cavity (44, 54) of the tubular slider bodies (40, 50).

8. The convertible device according to claim 1, characterised in that it further comprises a synchronizing unit (6), wherein the synchronizing unit (6) comprises rotation transmission shaft (6*a*) and transmission members (6*b*, 6*c*) secured to the rotation transmission shaft (6*a*), each transmission member (6*b*, 6*c*) being in movement transmission connection with a respective wheel holder member (20, 30).

9. The convertible device according to claim 1, characterised in that it further comprises support members (80, 90) adapted for connecting a carrier seat (18), wherein each support member (80, 90) comprises a coupling projection (81, 91) capable of securing the carrier seat (18), and wherein further slider bodies (60, 70), each comprising a respective curved guide track (61, 71), are disposed on the carrier body (10), mirror-symmetrically to the longitudinal principal plane (17) of the carrier body (10), at each side of said longitudinal principal plane (17), each slider body (60, 70) is associated with a sliding member (4, 5) that is configured to correspond in size and shape to the curved guide track (61, 71) of said slider body (60, 70), and can be displaced along the curved guide track (61, 71) of the slider body (60, 70), the carrier plane (63) containing the centreline (62) of the curved guide track (61) of one of the slider bodies (60) and the carrier plane (73) containing the centreline (72) of the curved guide track (71) of the other slider body (70) are disposed mirror symmetrically with respect to the longitudinal principal plane (17) of the carrier body (10), and the carrier plane (63) containing the centreline (62) of the curved guide track (61) of one of the slider bodies (60) and the carrier plane (73) containing the centreline (72) of the curved guide track (71) of the other slider body (70) lie at an acute angle of tilt (B) relative to each other, with the curved movement paths (4*a*, 5*a*) of the sliding members (4, 5) and the centrelines (62, 72) of the guide tracks (61, 71) of the slider body (60, 70) constituting mutually corresponding circular arcs, and the end (83) of one of the support members (80) situated opposite the other end (82) thereof carrying a coupling projection (81) being associated with one of the sliding members (4), and the end (93) of the other support member (90) situated opposite the other end (92) thereof carrying a coupling projection (91) being associated with the other sliding member (5), each support member (80, 90) is slidably coupled to the corresponding slider body (60, 70) by means of the sliding members (4, 5).

10. The convertible device according to claim 9, characterised in that one of the support members (80) and one of the sliding members (4) are each formed as a single-piece component, with the other support member (90) and the other sliding member (5) being also formed as single-piece components.

11. The convertible device according to claim 9, characterised in that it further comprises a synchronizing unit (6), wherein the synchronizing unit (6) comprises rotation transmission shaft (6a) and transmission members (6d, 6e) secured to the rotation transmission shaft (6a), each transmission member (6d, 6e) being in movement transmission connection with a respective support member (80, 90).

12. The convertible device according to claim 11, characterised in that the rotation transmission shaft (6a) of the synchronizing unit (6) comprises further transmission members (6b, 6c), wherein a part of the transmission members (6b, 6c) is in movement transmission connection with the wheel holder members (20, 30) and another part of the transmission members (6d, 6e) is in movement transmission connection with the support members (80, 90).

13. The convertible device according to claim 9, characterised in that the slider bodies (60, 70) and the support members (80, 90) are formed of tube sections, with the sliding members (4, 5) and the support members (80, 90) being retractably inserted, at least partially, into the tube cavity (64, 74) of the tubular slider bodies (60, 70).

14. The convertible device according to claim 1, characterised in that the carrier plane (43) containing the centreline (42) of the curved guide track (41) of one of the slider bodies (40) and the carrier plane (53) containing the centreline (52) of the curved guide track (51) of the other slider body (50) lie at a mutual angle of inclination ($\alpha$) smaller than 180°.

\* \* \* \* \*